United States Patent Office 2,806,019
Patented Sept. 10, 1957

---

2,806,019

QUATERNARY AMMONIUM COMPOUNDS OF POLYMERS OF THE CUMARONE-INDENE CLASS

Earl W. Lane, Philadelphia, Pa., assignor to Rohm & Haas Company, Philadelphia, Pa., a corporation of Delaware No Drawing. Application February 15, 1954, Serial No. 410,431

20 Claims. (Cl. 260—81)

This invention relates to quaternary ammonium compounds of polymers or resins of the cumarone-indene class and to the production thereof. By resins or polymers of "the cumarone-indene class," whenever referred to in the specification and claims hereof, is meant the so-called cumarone resins which consist essentially of addition polymers of cumarone, indene, their methyl derivatives and of mixtures thereof.

It is an object of the present invention to provide novel quaternary ammonium compounds. A more particular object is to provide quaternary ammonium compounds of polymers or resins of the cumarone-indene class having a variety of solubilities, some being of the water-insoluble, organic-solvent soluble type, and some being water-soluble. A further object is to provide quaternary ammonium compounds of this type which, because of their various solubilities, may be adapted for use in numerous ways as will be more particularly pointed out hereinbelow. Other objects and advantages of the invention will be apparent from the description thereof hereinafter.

The new compounds of the invention include quaternary ammonium bases, and salts corresponding thereto, that are obtainable from polymers of the cumarone-indene class in a manner described hereinbelow. The compounds of the invention are those which contain in the cumarone-indene polymer molecule at least 1 quaternary ammonium group having the structure of one of Formulas I, II and III following:

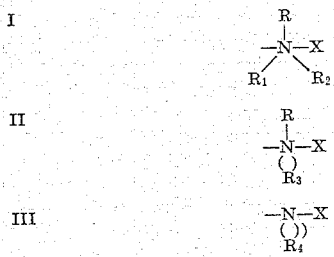

where X is OH, or a negative, salt-forming radical, R, R₁, and R₂ are each selected individually from the class consisting of aliphatic, alicyclic, aryl, arylaliphatic, and heterocyclic groups, and R₃ and R₄ are each selected from the group consisting of organic radicals forming with the N atom of the formula a 5- to 6-sided ring structure. In one preferred class, at least one of R, R₁, and R₂ is a lower alkyl group selected from the class consisting of methyl and ethyl. The free bond connected to the nitrogen represents the linkage to the polymer through an alkylene substituent of short chain length, such as from 1 to 4 carbon atoms. Preferred compounds are those which contain at least one such quaternary ammonium group per 1 to 5 monomeric units in the original resin molecule.

The compounds of the invention may be represented by the general structure of one of the Formulas IV, V, and VI following:

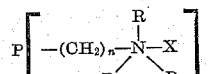
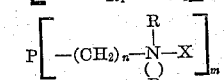
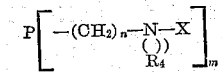

where P is the residue of a polymer of the cumarone-indene class, $n$ is an integer having values of 1 to 4 or more but preferably no more than 2, and $m$ has such a value in the preferred group that the compound contains at least one quaternary ammonium group per 1 to 5 monomeric units in the residue P, the other symbols having the same definition as above. The compositions of the invention actually include mixtures of the compounds as defined herein having various molecular weights from about 200 to 5000 and various degrees of quaternary substitution within the range stated. The compositions may also include compounds of the above structural constitution in which two or more of the residues P are coupled by alkylene groups $-(CH_2)_n-$ in which $n$ is an integer, such as from 1 to 4 but is preferably no more than 2.

These new compounds are generally useful as bactericides, fungicides, conditioning agents for leather and textiles, and particularly softeners therefor, as components of coating compositions for textiles, leather, papers and felts, agents for flocculating clays, such as kaolin and bentonite, as in water treatment processes, flocculating and/or agglomerating soils, as in the conditioning or stabilization of soils, and so on.

In general, the new quaternary ammonium compounds are obtained by introducing into a polymer of the cumarone-indene class halogeno-alkyl groups and then reacting the product with a tertiary amine to produce a quaternary ammonium salt. The salt may then be reacted with an alkali such as sodium hydroxide to produce the free quaternary ammonium base.

The polymer of the cumarone-indene class may have any suitable molecular weight such as from 200 to 5000. Lower molecular weights such as from 200 to 1500 may be preferred in certain cases when it may be desirable to allow some coupling between two or more polymer residues. In such cases, the low molecular weights permit a certain amount of such coupling without rendering the final product insoluble in organic solvents.

The first stage of the reaction involving the substitution of the polymer with a halogeno-alkyl group may involve chloromethylation, chloroethylation, bromomethylation, or the like. It may be effected by the treatment of the polymer with a mixture of an aldehyde, such as formaldehyde, revertible polymers thereof, paraldehyde, propionaldehyde, or butyraldehyde, and either hydrogen chloride or hydrogen bromide. A catalyst, such as anhydrous zinc chloride, zinc stearate, aluminum chloride, iron chloride, sulfuric acid or acetic acid or mixtures of such catalysts such as a mixture of a small proportion of aluminum chloride with fused zinc chloride may be employed. As a variation, the reaction may be performed with halogen-substituted ethers, such as chloromethyl methyl ether, dichloromethyl ether, bromomethyl ether or the like. When the ethers are used, they may be used with or without hydrogen chloride, but they are preferably used with a catalyst such as zinc chloride, acetic acid, or the like. In another modification, the resin may be chloroalkylated by reacting it with chlorosulfonic acid, formaldehyde, and a primary alcohol as in United States Patent No. 2,630,459.

The aldehyde or the ether may be used in excess and the reaction stopped at any desired point by de-activating the catalyst and/or removing the excess aldehyde or ether remaining after a pre-determined reaction time. However, the aldehyde or the ether may be used in an amount which is substantially equivalent to the degree of substitution desired. Generally, the reaction goes to substantial completion within about 1½ to 2 hours. Since the reaction is exothermic, it may be desirable to cool the reaction vessel. This may be done by providing it with a jacket for cooling liquids or by immersing the vessel partially within a cooling bath of liquid, such as water.

The extent of substitution may be controlled variously, such as by limiting the amount of catalyst, by controlling the temperature, or by varying the amount of halogeno-alkylating agent.

A preferable manner of carrying out this step of the reaction is to mix the polymer dissolved in a suitable solvent such as ethylenedichloride, chloroform, carbon tetrachloride, chlorobenzene, acetonitrile, dimethylformamide, nitromethane, and the like, and introducing the amount of the ether, such as chloromethyl ether, that is equivalent to the extent of substitution desired. Then a catalyst, such as anhydrous zinc chloride, is added and arrangement is made to allow refluxing of the solvent as well as cooling of the vessel. To reduce coupling in the higher molecular weight resins, the ratio of the ether to the catalyst should be increased.

After completion of the reaction, the substituted polymer is recovered, such as by pouring the reaction mixture into a solvent in which the substituted polymer is insoluble, but in which the catalyst is dissolved. After washing out impurities and drying, the substituted polymer is ready for the second stage of the process. Thorough washing with water and base (e. g. sodium hydroxide) assures that cross-linking is prevented during the drying or stripping operation.

In the second stage, the substituted polymer, such as the chloromethylated polymer, is quaternized, such as by dissolving it in a solvent and heating with a tertiary amine such as at temperatures between about 40° C. and 150° C.

Representative amines that may be used are the following:

Phenyldiethylamine
Phenyldimethylamine
Trimethylamine
Triethanolamine
N-methyldiethanolamine
N,N-dimethylethanolamine
Phenylethylethanolamine
m-Tolyldiethanolamine
Phenyldiethanolamine
Lauryldiethanolamine
Benzyldiethylamine
Benzyldimethylamine
(Trimethylbenzyl)dimethylamine
(Caprylbenzyl)dimethylamine
4-dimethylamino-2-phenyl-butene-1 of the Formula VII:

VII

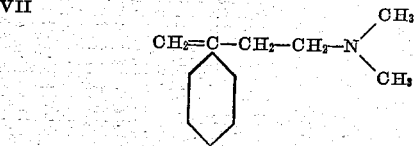

N,N'-dimethyl-N-(6,6-dimethylbicyclo-(1,1,3)-hept-2-ene-2-ethyl)amine of the Formula VIII:

VIII

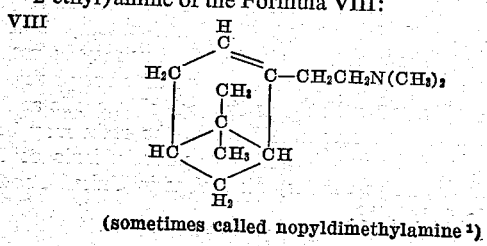

(sometimes called nopyldimethylamine [1])

Lauryldimethylamine
Dodecenyldimethylamine of the Formula IX:

IX

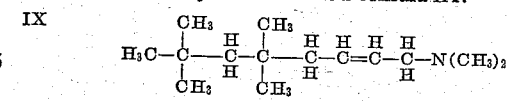

Myristyldimethylamine
Cetyldimethylamine
Didodecenylmethylamine of the Formula X:

X

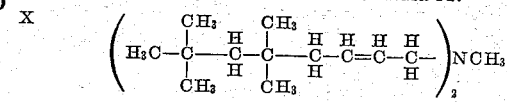

Triethylamine
Cyclohexyldimethylamine
Hexyldiethylamine
Dicyclohexylethylamine
N-methylmorpholine
N-methylpiperidine
N-nopylmorpholine [1]
Pyridine
N-methylpyrrole
2-methyl-5-ethylpyridine Alternatively, the halogenoalkylated polymer may be first reacted, such as in the presence of an alkali like NaOH, with a primary or secondary amine to form a secondary or tertiary amine respectively, with the elimination of hydrogen chloride or bromide and the resulting amine reacted with an organic halide, such as benzyl chloride, methyl iodide, ethyl bromide, or the like to effect quaternization. In this plural-stage procedure, the reaction may be hastened by heating to suitable temperatures, such as 50° C. to 150° C. This procedure is frequently advantageous to produce quaternary groups in the cumarone-indene resin in which the quaternary nitrogen forms part of a heterocyclic ring with $R_3$ or $R_4$ in the structural Formulas V and VI above. For example, the chloromethylated polymer is first reacted with morpholine and the resulting tertiary amine is quaternized with benzyl chloride.

During the reaction of the tertiary amine with the substituted polymer, water may be present but it is preferably not. Suitable solvents include dioxane, aromatics such as toluene, benzene, xylenes, trimethylbenzene, acetonitrile, dimethylformamide, nitromethane, and commercially available predominantly aromatic solvents, such as aromatic naphthas and methylated naphthalenes. The temperature may be controlled by selecting a solvent having a boiling point corresponding to the temperature desired and the solvent may be continuously refluxed. During the reaction, if the quaternary ammonium compound precipitates, water or alcohols may be added to re-dissolve it to hasten and complete the reaction. This procedure applies only to those situations in which the extent of substitution is sufficient to render the quaternary compound soluble in water or alcohols, or mixtures thereof.

Upon the completion of the reaction, the quaternary ammonium derivative is recovered. This may be accomplished merely by stripping off the solvent if the quaternary ammonium compound is soluble therein. If the quaternary ammonium compounds is insoluble in the solvent, however, recovery may involve mere filtration and drying.

The following examples illustrate the preparation of halogeno-alkylated polymers.

EXAMPLE A

A commercially available cumarone-indene polymer having an approximate average molecular weight of 575 (sold under the trade name Paradene No. 3) (57.5 grams) was mixed with 250 ml. of chloromethyl ether. To the

[1] The nopyl radical being the alicyclic hydrocarbon radical of the primary alcohol obtained by the reaction of β-pinene with formaldehyde.

resulting solution, 40 grams of anhydrous zinc chloride were added with stirring and the mixture immediately heated up to a reflux temperature of 57° C. The reaction vessel was placed on a water bath for ten minutes during which time the temperature gradually decreased to 47° C. The reaction mixture was allowed to stir overnight and the next day a mixture of 60 ml. of water and 60 ml. of dioxane was added. The resulting mixture was then poured slowly into methanol to precipitate the substituted polymer. The water deactivated the zinc chloride and the methanol into which the mixture was poured dissolved the catalyst and apparently dissolves or reacts with the ether, precipitating the substituted polymer in the form of a very finely-divided solid. The product was filtered off and washed with methanol. After stripping to dryness an 88-gram yield of chloromethylated cumarone-indene polymer was obtained which contained 21.4% chlorine by analysis. This corresponds substantially to the substitution of one chloromethyl group on each phenylene ring or benzene ring in the polymer (percent chlorine calculated 21.5%).

EXAMPLE B

The procedure of Example A was followed in another batch of the same cumarone-indene resin and a chloromethylated product was obtained containing 22.3% chlorine.

EXAMPLE C

A chloromethylated cumarone-indene resin was obtained from the polymer of Example A by substantially the same procedure therein except that only 20 grams of zinc chloride were added. The reaction mass reached a maximum temperature of 47° C. The product contained 17.8% chlorine.

EXAMPLE D

Example A was repeated except that only 10 grams of zinc chloride were added. The maximum temperature reached by the reaction mass was 35° C. and the resulting product contained 11.4% chlorine.

EXAMPLE E

A cumarone-indene polymer (average molecular weight of about 600) was charged in an amount of 50 grams with 100 ml. of ethylene dichloride and 27.2 g. of chloromethyl methyl ether into a reaction vessel. While stirring the mixture, 5 g. of zinc chloride was added. The temperature rose to 44° C. within a period of five minutes while stirring continued. The controls of the vessel were then heated to 55° C. for one hour while stirring continuously. Water (100 ml.) and 50 ml. of methanol were added to wash out unreacted catalyst and the remaining ether. The organic layer containing the chloromethylated polymer dissolved in ethylene chloride was separated from the aqueous layer and then washed with 10% aqueous sodium hydroxide and finally with water. After drying, the product was obtained in a yield of 57 g. and contained 5.2% chlorine by analysis.

EXAMPLE F

A cumarone-indene resin (average molecular weight of about 1200) was charged into a reaction vessel in an amount of 50 g. with 100 ml. of ethylene dichloride and 69.4 g. of chloromethyl ether. While stirring, 25 g. of anhydrous zinc chloride were added gradually and the temperature rose to 53° C. within six minutes. After several hours stirring, the chloromethylated product dissolved in ethylene dichloride was washed with a 50–50 methanol-water mixture, then with 10% aqueous sodium hydroxide, and finally with the 50–50 methanol-water mixture. It was then dried and analyzed for chlorine. It was found to contain 17.1% chlorine. Yield, 70 g.

EXAMPLE G

A polymer of cumarone having an average molecular weight of about 600 was charged into a reaction vessel and the procedure of Example F was followed. The chloromethylated product obtained was found to contain 18.2% chlorine.

EXAMPLE H

A polymer of indene having an average molecular weight of about 900 was chloromethylated by the procedure of Example F. The product obtained contained 16.5% chlorine.

Polymers of the cumarone-indene class having any other molecular weight from 200 to 5000 may also be halogenoalkylated to any extent of substitution in similar manner.

The following examples illustrate the quaternization of the substituted polymers:

EXAMPLE 1

Twenty-five grams of the chloromethylated indene-cumarone resin of Example A were dissolved in 50 ml. of dioxane. To the solution there were added 27.1 grams of 4-dimethylamino-2-phenyl-butene-1 and the mixture was heated to 70° C. Some of the quaternized polymer precipitated out so 50 ml. of water were added. It dissolved the polymer slowly. Stirring was effected during the entire reaction and several hours after the addition of water, the temperature had climbed to 80° C. The heat was then reduced and the reaction was allowed to continue while stirring overnight. The next morning the temperature had decreased to 54° C. After filtering, the reaction mass was stripped to dryness, thereby leaving the quaternary ammonium salt as a solid. It was soluble in water and butyl 2-ethoxyethyl ether. It was insoluble in acetone and aromatic hydrocarbon solvents. It analyzed 9.6% ionic chlorine and 3.9% nitrogen.

EXAMPLE 2

A charge of the chloromethylated resin of Example D (22 grams) and 50 ml. of dioxane was introduced into a reaction vessel and agitated. Trimethylamine was bubbled into the contents of the vessel as a gas over a period of 50 minutes, during which time the temperature rose to 68° C. During the introduction of the trimethylamine, agitation was continually maintained and 100 ml. of water were gradually added over the first 30 minutes of the amine addition. The mixture was stirred at room temperature for an additional eight hours and the product was obtained by stripping the solvent by means of steam and vacuum. The product was soluble in water but insoluble in acetone, butyl hydroxyethyl ether, kerosene, and aromatic naphthas. It flocculated kaolin and bentonite suspensions in water and had fungicidal and bactericidal properties as indicated in a subsequent table.

Analysis of product: 8.2% of ionic chlorine, 3.9% N. Theory: 9.3% of ionic chlorine, 3.7% N.

EXAMPLE 3

(a) A chloromethylated resin of Example F (30.5 grams) and dioxane (50 ml.) were charged into a reaction vessel and trimethylamine was introduced as in Example 2. The procedure of Example 2 was followed and a quaternized resin was obtained which had the same solubilities as that obtained in Example 2.

Analysis of product: 11.9% ionic chlorine, 4.9% N. Theory: 11.9% ionic chlorine, 4.7% N.

(b) The same procedure was followed with the resins of Examples G and H. The products had solubilities similar to that of the product made under (a) hereof.

EXAMPLE 4

A chloromethylated resin of Example A (33.2 grams) and 50 ml. of dioxane were charged into a reaction vessel and the procedure of Example 2 was followed to produce the quaternary ammonium compound from trimethylamine. The yield of the quaternary ammonium compound was 46 grams and its solubility was similar to that of the compound obtained in Example 2.

Analysis: 14.5% ionic chlorine, 6.3% N. Theory: 16.1% ionic chlorine, 6.3% N.

EXAMPLE 5

The chloromethylated resin of Example D (24.8 grams) was charged with 50 ml. of dioxane and 10.8 grams of benzyldimethylamine into a reaction vessel while stirring. The temperature immediately began to rise and 100 ml. of water were added over a 15 minute period. The mixture was heated at 50±10° C. for approximately 20 hours. The product was filtered and stripped to dryness. It was soluble in hot butyl hydroxyethyl ether, hot water and hot kerosene, but insoluble in acetone, aromatic naphthas, cold water, cold butyl hydroxyethyl ether, and cold kerosene.

Analysis: 6.5% ionic chlorine, 2.8% N. Theory: 7.9% ionic chlorine, 3.1% N.

EXAMPLE 6

The chloromethylated resin of Example C (28 grams) was charged with 50 ml. of dioxane and 18.5 grams of benzyldimethylamine. Otherwise, the procedure was substantially the same as that in Example 5. The quaternary ammonium compound obtained was soluble in water and hot butyl hydroxyethyl ether, but insoluble in acetone, kerosene, aromatic naphthas, and cold butylhydroxyethyl ether.

Analysis: 9.2% ionic chlorine, 3.8% N. Theory: 10.7% ionic chlorine, 4.1% N.

EXAMPLE 7

(a) The chloromethylated resin of Example A (33.2 grams) was charged with 50 ml. of dioxane and 26.5 grams of benzyldimethylamine into a reaction vessel and the procedure was otherwise the same as in Example 5. The quaternary ammonium compound resulting from the reaction was obtained in a yield of 57 grams and had the same solubility as the product of Example 6.

Analysis: 10.4% ionic chlorine, 4.1% N.

(b) The same procedure was followed substituting 17.8 grams of dimethylethanolamine for the 26.5 g. of benzyldimethylamine.

In the same way, any of the resins of Examples A to H inclusive may be reacted with (c) triethanolamine, (d) N-methyldiethanolamine, (e) phenylethylethanolamine, (f) m-tolyldiethanolamine, and (g) phenyldiethanolamine.

EXAMPLE 8

The chloromethylated resin of Example B (16.5 grams) and 100 ml. of dioxane and 19.4 grams of nopyldimethylamine were introduced into a reaction vessel with stirring. Agitation was maintained for a period of 18 hours during which time the temperature was maintained at 60±15° C. During the reaction, some solid precipitated out and a small amount of methanol was added to re-dissolve it. At the end of the period, the product was filtered and stripped to dryness. A yield of 31 grams of the quaternary ammonium compound was obtained, and it was soluble in water and butyl hydroxyethyl ether, but insoluble in acetone, aromatic naphthas and kerosene.

Analysis: 8.7% ionic chlorine, 3.3% N.

EXAMPLE 9

(a) The chloromethylated resin of Example B (16.5 grams) was charged with 100 ml. of dioxane and 21.3 grams of lauryldimethylamine into a reaction vessel, and the procedure of Example 8 was followed. The quaternary ammonium compound obtained was soluble in butyl hydroxyethyl ether, but insoluble in water, acetone, aromatic naphthas and kerosene.

Analysis: 8.2% ionic chlorine, 3.3% N.

(b) The same procedure was followed substituting 30.1 grams of lauryldiethanolamine for the 21.3 g. of lauryldimethylamine. The product was useful as a corrosion inhibitor, such as in lubricating oils and as an antistatic agent for textiles, such as cellulose acetate. Its antistatic effect may be enhanced by further reaction with ethylene oxide to introduce 2 to 20 or more oxyethylene units per quaternary ammonium group.

(c) The procedure of (a) hereof was followed substituting the resins of Examples G and H respectively for the resin of Example B.

EXAMPLE 10

The chloromethylated resin of Example B (16.5 grams) was charged with 50 ml. of dioxane and 35 grams of cetyldimethylamine into a reaction vessel and the procedure of Example 8 was followed. The quaternary ammonium product had the same solubility as the product of the preceding example and analyzed 2.6% N.

EXAMPLE 11

The chloromethylated resin of Example B (16.5 grams) was charged with 100 ml. dioxane and 36.3 grams of didodecenyl methylamine into a reaction vessel, and the procedure of Example 8 was followed except that no methanol was added. The quaternary ammonium compound obtained contained 2.9% N and was soluble in acetone and benzene, but insoluble in water, aromatic naphthas and kerosene.

EXAMPLE 12

The chloromethylated resin of Example B (25 grams) was charged with 50 ml. dioxane and 24.3 grams of hexyldiethylamine into a reaction vessel, and the procedure of Example 8 was followed except that a small amount of toluene was added instead of methanol to re-dissolve the precipitate formed in the early part of the reaction. The quaternary ammonium product was soluble in acetone, butyl hydroxyethyl ether, and toluene, but insoluble in water, aromatic naphthas and kerosene.

Analysis: 6.9% ionic chlorine, 2.4% N.

EXAMPLE 13

(a) The chloromethylated resin of Example A (16.5 grams) was charged with 100 ml. of dioxane and 10.1 grams of N-methylmorpholine and the reaction was carried out in accordance with the procedure of Example 8 above. A 26 gram yield of the quaternary ammonium compound was obtained and the product was soluble in water, but insoluble in acetone, aromatic naphthas, kerosene and butyl hydroxyethyl ether.

Analysis: 12.2% ionic chlorine, 4.5% N.

In the same way, other amines having divalent hydrocarbon chains forming a heterocycle with a nitrogen atom, such as piperidine, pyrrolidine, and thiamorpholine may be reacted with residues of any of Examples A to H inclusive to produce resinous quaternary nitrogen compounds.

EXAMPLE 14

The chloromethylated resin of Example A (25 grams) was charged with 50 ml. dioxane and 12.3 grams of pyridine into a reaction vessel. The procedure followed was the same as in Example 8 except that water was added instead of methanol to redissolve the precipitate that was formed early in the reaction. The quaternary ammonium compound obtained was soluble in water, but insoluble in acetone, aromatic naphthas, kerosene, and butyl hydroxyethyl ether.

Analysis: 13.5% ionic chlorine, 4.9% N.

EXAMPLE 15

The procedure of Example 8 was followed for reacting the chloromethylated resin of Example B with each of the following tertiary amines:

(a) 2-methyl-5-ethyl pyridine
(b) (Capyrylbenzyl)dimethylamine
(c) Myristyldimethylamine (d) Nopyl morpholine
(e) Triethylamine
(f) (Trimethylbenzyl)dimethylamine
(g) Dimethyldodecenylamine The quaternary ammonium compounds obtained were tested for fungitoxicity and bactericidal power, with the results indicated in the table hereinafter.

The quaternary ammonium bases obtained by the addition of an alkali such as sodium hydroxide to the salts above are fairly strong bases. Some of the salts and bases are water-soluble and some are water-insoluble, but soluble in organic solvents such as in diethyleneglycol or butyl 2-ethoxyethyl ether. Those that are water-soluble are particularly adaptable to use as bactericides, and those that are water-insoluble but soluble in organic solvents are especially useful as fungicides. For this latter purpose, they may be combined with auxiliary sticking agents or wetting agents. The quaternary ammonium salts of this invention generally are characterized by substantially zero phytotoxicity.

The following table lists the results of fungitoxicity and bactericidal tests with the compounds of the preceding examples. The lethal dose in parts per million for 50% inhibition of the germination of the spores of *Stemphilium sarcinaeforme* and *Monilinia fructicola* and the phenol coefficients of effectiveness against *Salmonella typhosa* and *Micrococcus pyogenes* var. *aureus* measured by accepted methods are given in the following table. In all cases, the phytotoxicity on tomatoes even in concentrations of 1% was zero.

Table

| Example Numbers | Fungitoxicity | | Phenol Coeff. | |
|---|---|---|---|---|
| | S. s. | M. f. | S. t. | M. p. |
| 1 | 4 | 2 | 1.9 | 53 |
| 2 | <10 | <5 | <1.2 | 80 |
| 3 (a) | 3 | <2.5 | <1.2 | 93 |
| 4 | 1 | <1 | <1.2 | <1.6 |
| 5 | <10 | <2.5 | <1.2 | 53 |
| 6 | <10 | <2.5 | <1.2 | 135 |
| 7 (a) | <10 | <2.5 | <1.2 | 105 |
| 8 | <10 | <5 | 1.1 | 53 |
| 9 (a) | <50 | <50 | 16 | 12.5 |
| 10 | <50 | <50 | | |
| 11 | <100 | <5 | 9.7 | 5.8 |
| 12 | 36 | <50 | 16 | 2.7 |
| 13 (a) | <10 | <2.5 | | |
| 14 | 4 | 3 | <1.1 | 1.5 |
| 15 (a) | 10 | <5 | <1.1 | 3.8 |
| 15 (b) | 15 | 25 | 35 | 17 |
| 15 (c) | <100 | <50 | 17 | 7.7 |
| 15 (d) | 10 | 6 | <1.1 | 17 |
| 15 (e) | <10 | <5 | <1.1 | <1.5 |
| 15 (f) | <2.5 | <1 | 4.2 | 9.2 |
| 15 (g) | <2 | 8 | 33 | 62 |

Because of the inexpensiveness of the resins from which the quaternary ammonium compounds of the present invention are derived, they are relatively inexpensive quaternary ammonium compounds of resinous character. Those of low to moderate molecular weight are cationic surface-active agents of practical value. Those containing long chain aliphatic radicals on the quaternary ammonium nitrogen atom are particularly useful for applications to paper and textiles especially of cellulosic character, such as cotton, or of proteinous character, such as wool, as well as to leather in which application they serve to condition and soften the material to which they are applied.

It is to be understood that changes and variations may be made without departing from the spirit and scope of the invention as defined in the appended claims.

I claim:

1. As a new composition of matter, a polymer of at least one member selected from the group consisting of cumarone and indene containing, attached directly to aryl nuclei of the polymer, quaternary ammonium nitrogen groups having the general structure of one of Formulas XI, XII, and XIII:

XI 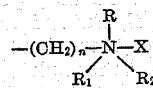

XII 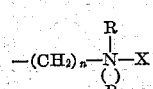

XIII 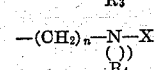

where $n$ is an integer having a value of 1 to 4, X is selected from the group consisting of OH and negative salt-forming radicals, R, $R_1$, and $R_2$ are each selected individually from the class consisting of aliphatic, alicyclic, aryl, arylaliphatic, and heterocyclic groups, and $R_3$ and $R_4$ are each selected from the group consisting of organic radical forming with the N atom of the formula a 5- to 6-sided ring structure, said organic radical being composed of atoms selected from the group consisting of carbon, hydrogen, oxygen, and sulfur atoms, there being at the most in said organic radical one of the last two-named atoms.

2. A new composition of matter as defined in claim 1 in which the polymer contains one quaternary ammonium nitrogen group per 1 to 5 monomeric units of the original polymer.

3. A new composition as defined in claim 1 in which each quaternary ammonium nitrogen atom is linked to the polymer through a methylene group.

4. A new composition of matter as defined in claim 1 in which the polymer contains one quaternary ammonium nitrogen group per 1 to 5 monomeric units of the original polymer and $n$ is 1.

5. A new composition of matter as defined in claim 1 in which the polymer has a molecular weight of 200 to 5000.

6. A new composition of matter as defined in claim 1 in which the polymer has a molecular weight of 200 to 1500 excluding the groups of Formulas XI, XII, and XIII.

7. As a new composition of matter, a polymer of at least one member selected from the group consisting of cumarone and indene containing, per 1 to 5 monomeric units of the original polymer and attached directly to an aryl nucleus of the polymer, about one quaternary ammonium group having the formula

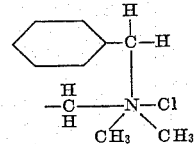

8. As a new composition of matter, a polymer of at least one member selected from the group consisting of cumarone and indene containing, per 1 to 5 monomeric units of the original polymer and attached directly to an aryl nucleus of the polymer, about one quaternary ammonium group having the formula

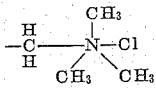

9. As a new composition of matter, a polymer of at least one member selected from the group consisting of cumarone and indene containing, per 1 to 5 monomeric units of the original polymer and attached directly to an aryl nucleus of the polymer, about one quaternary ammonium group having the formula

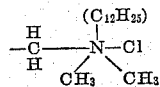

10. As a new composition of matter, a polymer of at least one member selected from the group consisting of cumarone and indene containing, per 1 to 5 monomeric units of the original polymer and attached directly to an aryl nucleus of the polymer, about one quaternary ammonium group having the formula

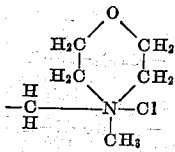

11. As a new composition of matter, a polymer of at least one member selected from the group consisting of cumarone and indene containing, per 1 to 5 monomeric units of the original polymer and attached directly to an aryl nucleus of the polymer, about one quaternary ammonium group having the formula

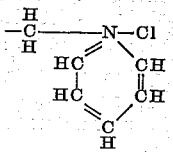

12. A process for producing a quaternary ammonium compound comprising the steps of halogeno-alkylating a polymer of at least one member selected from the group consisting of cumarone and indene having a molecular weight of 200 to 5000 and reacting the resulting product with an amine to replace the halogen atoms with a substitued nitrogen atom and quaternizing the nitrogen atoms.

13. A process comprising chloromethylating a polymer of at least one member selected from the group consisting of cumarone and indene having a molecular weight of 200 to 5000, and heating the chloromethylated polymer with a tertiary amine to produce quaternary ammonium groups therein.

14. A process as defined in claim 13 in which the tertiary amine is trimethylamine.

15. A process as defined in claim 13 in which the tertiary amine is lauryldimethylamine.

16. A process as defined in claim 13 in which the tertiary amine is benzyldimethylamine.

17. A process as defined in claim 13 in which the tertiary amine is pyridine.

18. A process as defined in claim 13 in which the tertiary amine is N-methyl-morpholine.

19. A process comprising reacting a polymer of at least one member selected from the group consisting of cumarone and indene with a chloroalkyl methyl ether in which the chloroalkyl group has 1 to 4 carbon atoms in the presence of a catalyst to produce a dissolved chloroalkylated polymer, said reaction being effected on the polymer in solution, washing the resulting solution of chloroalkylated polymer and drying to remove the solvent, the washing being accomplished in a plurality of steps comprising one with an alcoholic medium, and another with an aqueous alkali metal hydroxide.

20. A process comprising dissolving a polymer of at least one member selected from the group consisting of cumarone and indene in a solvent, introducing an excess of chloromethyl methyl ether and a catalyst to produce a dissolved chloromethylated polymer, washing the resulting polymer solution, and removing solvent to dry the polymer, the washing being effected in a plurality of steps comprising at least one with aqueous methanol and another with aqueous sodium hydroxide solution.

References Cited in the file of this patent

UNITED STATES PATENTS

| | | |
|---|---|---|
| 2,565,222 | Geiger | Aug. 21, 1951 |
| 2,590,771 | Jordan | Mar. 25, 1952 |
| 2,595,225 | Coffman | May 6, 1952 |
| 2,616,877 | McMaster | Nov. 4, 1952 |
| 2,617,781 | Lytton | Nov. 11, 1952 |
| 2,683,125 | D'Alelio | July 6, 1954 |
| 2,694,702 | Jones | Nov. 16, 1954 |

FOREIGN PATENTS

| | | |
|---|---|---|
| 694,778 | Great Britain | July 29, 1953 |